(12) United States Patent
Nishino et al.

(10) Patent No.: US 11,947,623 B2
(45) Date of Patent: Apr. 2, 2024

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Kaneharu Nishino, Yokohama (JP); Ryusei Shingaki, Setagaya (JP); Ken Ueno, Tachikawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/186,261

(22) Filed: Feb. 26, 2021

(65) Prior Publication Data

US 2022/0067124 A1 Mar. 3, 2022

(30) Foreign Application Priority Data

Aug. 28, 2020 (JP) ................................. 2020-144410

(51) Int. Cl.
*G06F 17/18* (2006.01)
*G06F 3/14* (2006.01)
*G06N 20/00* (2019.01)

(52) U.S. Cl.
CPC ............... *G06F 17/18* (2013.01); *G06F 3/14* (2013.01); *G06N 20/00* (2019.01)

(58) Field of Classification Search
CPC .................................. G06F 17/18; G06F 3/14
See application file for complete search history.

(56) References Cited

U.S. PATENT DOCUMENTS

2009/0187381 A1* 7/2009 King ................... G06K 9/6284
702/183

FOREIGN PATENT DOCUMENTS

CN 103257000 A * 8/2013
CN 105160420 A * 12/2015
(Continued)

OTHER PUBLICATIONS

Morgan et al., "Probability distributions for offshore wind speeds" Energy Conversion and Management 52 (2011) 15-26 (Year: 2011).*
(Continued)

*Primary Examiner* — John C Kuan
(74) *Attorney, Agent, or Firm* — Oblon, McClelland, Maier & Neustadt, L.L.P.

(57) ABSTRACT

An information processing device according to an embodiment estimates a probability distribution of a maximum value or a minimum value of time-series target sensor data in a designated estimation period after a base time. The information processing device includes one or more hardware processors that: calculate a reference feature amount representing a feature of related sensor data at a reference time before the base time based on a preset feature amount calculation model; estimate a reference distribution parameter in a reference period based on a preset parameter estimation model; update the feature amount calculation model and the parameter estimation model; calculate an estimation feature amount representing the feature of related sensor data at the base time based on the updated feature amount calculation model; and estimate an estimation distribution parameter based on the updated parameter estimation model.

17 Claims, 14 Drawing Sheets

(56) References Cited

FOREIGN PATENT DOCUMENTS

| | | | | | |
|---|---|---|---|---|---|
| CN | 110598181 | A | * | 12/2019 | ............. G06F 17/18 |
| CN | 111242411 | A | * | 6/2020 | |
| JP | 2007-221699 | A | | 8/2007 | |
| JP | 2008-102115 | A | | 5/2008 | |
| JP | 6186303 | B2 | | 8/2017 | |
| JP | 2019-028931 | A | | 2/2019 | |
| KR | 101793625 | B1 | * | 11/2017 | ............. G06F 17/18 |

OTHER PUBLICATIONS

Coles, S., "An Introduction to Statistical Modeling of Extreme Values", Springer, 2001, pp. 104-123.

* cited by examiner

FIG.2

| DATE AND TIME | INFLOW | PRECIPITATION AT FIRST POINT | PRECIPITATION AT SECOND POINT |
|---|---|---|---|
| 2019/04/02 14:50 | 364 | 80 | 65 |
| 2019/04/02 15:00 | 370 | 75 | 33 |
| 2019/04/02 15:10 | 372 | 2 | 10 |
| 2019/04/02 15:20 | 369 | 0 | 0 |
| 2019/04/02 15:30 | 375 | 4 | 2 |
| 2019/04/02 15:40 | 371 | 15 | 19 |
| 2019/04/03 09:20 | 415 | 40 | 88 |

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2020-144410, filed on Aug. 28, 2020; the entire contents of which are incorporated herein by reference.

FIELD

Embodiments described herein relate generally to an information processing device, an information processing method, and a computer program product.

BACKGROUND

In hydroelectric power generation, wind power generation, and the like, for optimizing an observed value of an observation target, there is a desire to control the observation target by using an estimated value of another observation target related to the original observation target (a related target). For example, there is a desire to control a discharge amount from a reservoir in the hydroelectric power generation or a blade angle in the wind power generation based on an estimated value of an inflow amount to the reservoir or an estimated value of wind speed such that the amount of power generation is maximized.

However, when the discharge amount from the reservoir in the hydroelectric power generation or the blade angle in the wind power generation exceeds a safety margin in design, it causes an accident such as the collapse of the reservoir and the breakage of the blade. Therefore, when controlling the discharge amount or the blade angle based on the estimated value of the inflow amount or the estimated value of the wind speed, it is necessary to optimize the observed value of the observation target while preventing an event that exceeds the safety margin with respect to the observation target.

Considering above, after the observed value of the observation target is estimated, when the estimated value of the observation target is within the range of the safety margin, control is performed such that optimization is prioritized. On the other hand, when the estimated value of the observation target exceeds the safety margin, control is performed such that safety is prioritized over optimization. Therefore, in the hydroelectric power generation, the wind power generation, and the like, when control is performed based on the estimated value of the other related target in order to optimize the observed value of the observation target, it is required to estimate a maximum value or a minimum value of the observed value of the observation target in a certain future period.

As the related art for estimating the maximum value, there is a technology of estimating a value at each time and estimating an upper limit value of a traffic volume based on the value at each time in order to optimize capital investment for communication infrastructure. However, in such a technology, it is not possible to estimate an extremely large or small value that occurs rarely. Furthermore, in such a technology, since the upper limit value itself is estimated, it is not possible to calculate the probability distribution of the upper limit value.

Furthermore, as a probability model that handles the maximum value, extreme value statistics have been known. In the field of the extreme value statistics, a non-stationary extreme value model, in which a time change term is introduced into a parameter of a generalized extreme value distribution followed by the maximum value, has been known in the related art. However, in the non-stationary extreme value model, it is necessary to manually formulate the time change term of the distribution parameter. Accordingly, in such a non-stationary extreme value model, when a time change in the distribution differs for each piece of data, it is necessary to design the time change term for each piece of data, which requires a large design effort.

Therefore, there is a need for easily and accurately estimating a probability distribution of a maximum value or a minimum value of target sensor data in an estimation period.

BRIEF DESCRIPTION OF THE DRAWINGS

FIG. 2 is a diagram illustrating an example of sensor data;

DETAILED DESCRIPTION

An information processing device according to an embodiment is configured to estimate a probability distribution of a maximum value or a minimum value of time-series target sensor data in a designated estimation period after a base time, the time-series target sensor data being obtained by observing an observation target. The information processing device includes one or more hardware processors. The one or more hardware processors configured to: calculate a reference feature amount representing a feature of one or more pieces of related sensor data at a reference time before the base time, the reference feature amount being calculated based on: one or more pieces of time-series related sensor data obtained by observing one or more related targets observed together with the observation target before the reference time; and a preset feature amount calculation model; estimate a reference distribution parameter being a distribution parameter of a probability density function representing the probability distribution of the maximum value or the minimum value of the target sensor data in a reference period in which a time relation with respect to the reference time is the same as a time relation of the estimation period with respect to the base time, the reference distribution parameter being estimated based on the reference feature amount at the reference time and a preset parameter estimation model; update at least one of the feature amount calculation model and the parameter estimation model based on: an actual measurement value of the maximum value or the minimum value of the target sensor data in the reference period corresponding to the reference time; and the probability distribution of the maximum value or the minimum value of the target sensor data in the reference period, the probability distribution being generated for the reference time based on the reference distribution parameter; calculate an estimation feature amount representing the feature of the one or more pieces of related sensor data at the base time, the estimation feature amount being calculated based on: the one or more pieces of time-series related sensor data before the base time; and the updated feature amount calculation model; and estimate an estimation distribution parameter being the distribution parameter of the probability density function representing the probability distribution of the maximum value or the minimum value of the target sensor data in the estimation period, the estimation distribution parameter being estimated based on the estimation feature amount at the base time and the updated parameter estimation model.

Hereinafter, an estimation system 20 according to embodiments will be described with reference to the drawings. The estimation system 20 estimates a probability distribution of a maximum value or a minimum value of time-series target sensor data, which is obtained by observing observation targets 14, in an estimation period.

First Embodiment

Figure 1:
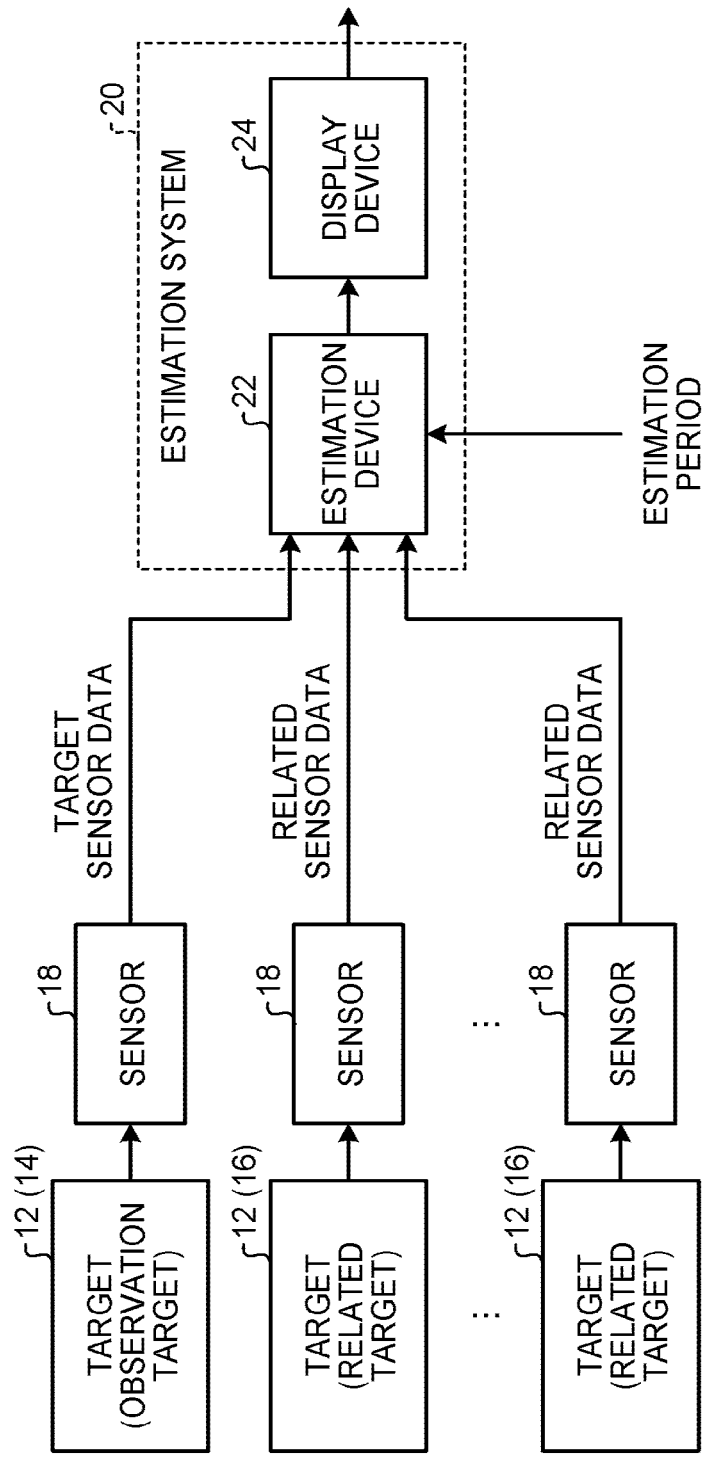
FIG. 1 is a diagram illustrating a configuration of an estimation system together with targets and sensors.

FIG. 1 is a diagram illustrating a configuration of the estimation system 20 together with a plurality of targets 12 and a plurality of sensors 18. The estimation system 20 includes an estimation device 22 and a display device 24.

The estimation device 22 acquires, from the sensors 18, a plurality of pieces of time-series target sensor data obtained by observing the targets 12. The estimation device 22 designates any one of the targets 12 as an observation target 14. Sensor data obtained by observing the observation target 14 is called target sensor data. Furthermore, the estimation device 22 designates any one or more targets 12 among the targets 12 as one or more related targets 16. Sensor data obtained by observing the related targets 16 is called related sensor data.

The observation target 14 and the one or more related targets 16 are observed together. For example, the observation target 14 and the one or more related targets 16 are, for example, simultaneously observed, or are, for example, correlated or provided in the same measurement system.

For example, when the observation target 14 is a discharge amount from a reservoir in hydroelectric power generation, the related targets 16 are an inflow amount to the reservoir, a precipitation of the reservoir, a precipitation in an upper stream of the reservoir, and the like. When the observation target 14 is a blade angle of a generator in wind power generation, the related target 16 is a wind speed around the generator, for example.

The target sensor data and one or more pieces of related sensor data may be any sensor data. For example, the target sensor data and the one or more pieces of related sensor data may be environmental conditions such as temperature and humidity, and current and voltage of the observation target 14 or the related target 16, and the amount of gas or fluid input to or output from the observation target 14 or the related target 16, and the like.

Note that each of the observation target 14 and the one or more related targets 16 are designated on the estimation device 22 by a user from among the targets 12. Each of the observation target 14 and the one or more related targets 16 may be switched.

The estimation device 22 estimates the probability distribution of the maximum value or the minimum value of the target sensor data in an estimation period. The display device 24 displays the probability distribution of the maximum value or the minimum value of the target sensor data in the estimation period, which is estimated by the estimation device 22, under the control of the estimation device 22. Furthermore, the display device 24 also displays other information generated by the estimation device 22.

FIG. 2 is a diagram illustrating an example of the sensor data. When the target sensor data is the discharge amount from the reservoir in the hydroelectric power generation, for example, the estimation device 22 acquires related sensor data illustrated in FIG. 2. More specifically, the estimation device 22 acquires, as the pieces of related sensor data, the inflow amount to the reservoir, the precipitation at a first point, and the precipitation at a second point, each being observed every 10 minutes. Note that the sensor data is not limited thereto and may be other pieces of data.

Figure 3:
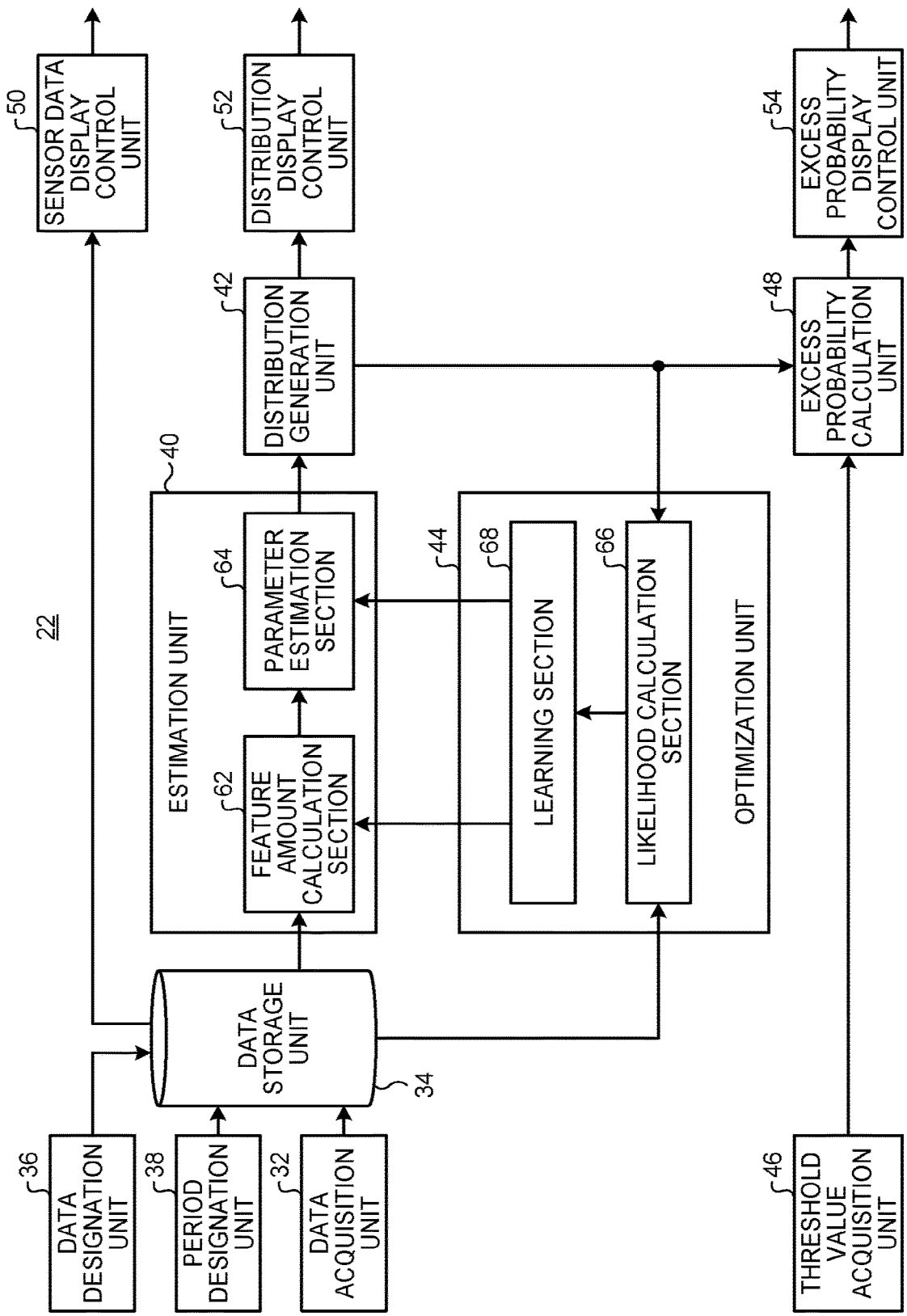
FIG. 3 is a configuration diagram of an estimation device of a first embodiment.

FIG. 3 is a diagram illustrating a functional configuration of the estimation device 22 according to the first embodiment. The estimation device 22 according to the first embodiment includes a data acquisition unit 32, a data storage unit 34, a data designation unit 36, a period designation unit 38, an estimation unit 40, a distribution generation unit 42, an optimization unit 44 (an update unit), a threshold value acquisition unit 46, an excess probability calculation unit 48, a sensor data display control unit 50, a distribution display control unit 52, and an excess probability display control unit 54.

The data acquisition unit 32 acquires a plurality of pieces of time-series sensor data, applies a time stamp representing an observed time to the sensor data, and stores the sensor data in the data storage unit 34. The data acquisition unit 32 acquires, for example, a plurality of pieces of sensor data at regular intervals, and stores the acquired sensor data in the data storage unit 34.

The data designation unit 36 receives the designation of the target sensor data, for which the probability distribution of the maximum value or the minimum value is estimated, from among the pieces of sensor data. Furthermore, the data designation unit 36 receives the designation of the one or more pieces of related sensor data from among the pieces of sensor data. Note that the data designation unit 36 may put the target sensor data into the one or more pieces of related sensor data.

The period designation unit 38 receives a designation of the estimation period. The period designation unit 38 may receive a plurality of estimation periods. When the plurality of estimation periods are received, the estimation unit 40, the distribution generation unit 42, the optimization unit 44, the excess probability calculation unit 48, the distribution display control unit 52, and the excess probability display control unit 54 perform processing for each of the estimation periods. Furthermore, the period designation unit 38 sets a plurality of reference times for each estimation period. The respective reference times are different from each other, and each of them is a time before a base time.

The estimation unit 40 estimates a reference distribution parameter, which is a distribution parameter of a probability density function representing the probability distribution of the maximum value or the minimum value of the target sensor data in a reference period, based on the one or more pieces of time-series related sensor data before a corresponding reference time and a preset estimation model for each of the reference times. Moreover, after the estimation model is optimized by the optimization unit 44, the estimation unit 40 estimates an estimation distribution parameter, which is the distribution parameter of the probability density function representing the probability distribution of the maximum value or the minimum value of the target sensor data in the estimation period, based on the one or more pieces of time-series related sensor data before the base time and the optimized estimation model.

In the present embodiment, the estimation unit 40 has a feature amount calculation section 62 and a parameter estimation section 64.

The feature amount calculation section 62 calculates a reference feature amount representing the feature of the one or more pieces of related sensor data at a corresponding reference time for each of the reference times. The reference feature amount may be a vector including a plurality of values. In such a case, the feature amount calculation section 62 calculates the reference feature amount at the corresponding reference time for each of the reference times based on the one or more pieces of time-series related sensor data before the corresponding reference time and a preset feature amount calculation model.

Moreover, after the feature amount calculation model is optimized by the optimization unit 44, the feature amount calculation section 62 calculates an estimation feature amount representing the feature of the one or more pieces of related sensor data at the base time. The estimation feature amount is data representing the same feature as that of the reference feature amount and may be a vector including a plurality of values. In such a case, the feature amount calculation section 62 calculates the estimation feature amount at the base time based on the one or more pieces of time-series related sensor data before the base time and the optimized feature amount calculation model.

For each of the reference times, the parameter estimation section 64 estimates the reference distribution parameter in the reference period. In such a case, the parameter estimation section 64 estimates the reference distribution parameter at a corresponding reference time for each of the reference times based on the reference feature amount at the corresponding reference time and a preset parameter estimation model.

Moreover, after the parameter estimation model is optimized by the optimization unit 44, the parameter estimation section 64 estimates the estimation distribution parameter in the estimation period. In such a case, the parameter estimation section 64 estimates the estimation distribution parameter in the estimation period based on the estimation feature amount at the base time and the optimized parameter estimation model.

For each of the reference times, the distribution generation unit 42 generates the probability distribution of the maximum value or the minimum value of the target sensor data in the reference period based on the reference distribution parameter estimated by the estimation unit 40. Moreover, the distribution generation unit 42 generates the probability distribution of the maximum value or the minimum value of the target sensor data in the estimation period based on the estimation distribution parameter estimated by the estimation unit 40.

The optimization unit 44 optimizes the estimation model, which is used in the estimation unit 40, based on an actual measurement value of the maximum value or the minimum value of the target sensor data in the reference period corresponding to each of the reference times, and the probability distribution of the maximum value or the minimum value of the target sensor data in the reference period, which is generated for each of the reference times based on the reference distribution parameter. In the present embodiment, the optimization unit 44 optimizes, as the estimation model, the feature amount calculation model used in the feature amount calculation section 62 and the parameter estimation model used in the parameter estimation section 64.

In the present embodiment, the optimization unit 44 has a likelihood calculation section 66 and a learning section 68.

For each of the reference times, the likelihood calculation section 66 calculates likelihoods of the actual measurement value of the maximum value or the minimum value of the target sensor data in the reference period and the probability distribution of the maximum value or the minimum value of the target sensor data in the reference period, which is calculated based on the reference distribution parameter.

The learning section 68 adjusts internal parameters included in the estimation model so as to maximize the sum of the likelihoods of the reference times. For example, the learning section 68 adjusts the internal parameters included in at least one of the feature amount calculation model and the parameter estimation model so as to maximize the sum of the likelihoods of the reference times.

The threshold value acquisition unit 46 acquires a threshold value for the maximum value or the minimum value in the estimation period. The threshold value acquisition unit 46 may acquire a threshold value designated by a user. Furthermore, the threshold value may be, for example, a value representing a safety margin in design of a device and the like related to the observation target 14. The excess probability calculation unit 48 calculates an excess probability that the maximum value of the target sensor data in the estimation period exceeds a set threshold value, or an excess probability that the minimum value of the target sensor data in the estimation period becomes less than the threshold value, based on the generated probability distribution.

The sensor data display control unit 50 causes the display device 24 to display a time-series change in the target sensor data before the base time. The distribution display control unit 52 causes the display device 24 to display the probability distribution of the maximum value or the minimum value of the target sensor data in the estimation period. The excess probability display control unit 54 causes the display device 24 to display the calculated excess probability. When the excess probability exceeds the set threshold value, the excess probability display control unit 54 may emphasize the excess probability and cause the display device 24 to display the emphasized excess probability.

Note that the estimation device 22 may transmit the generated probability density function and excess probability to another device.

Figure 4:
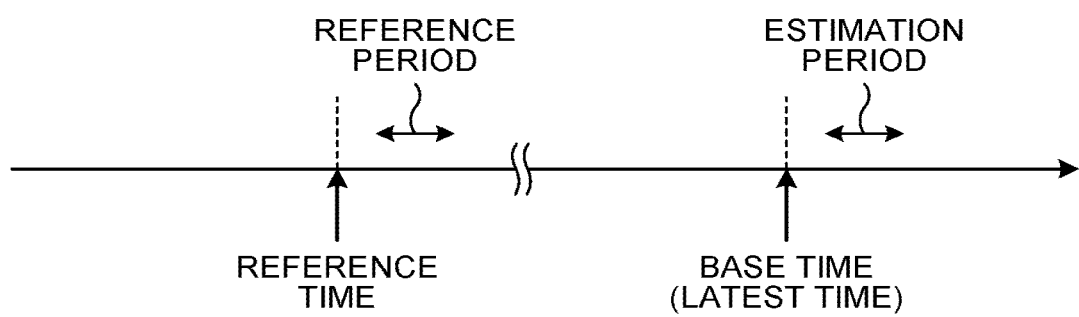
FIG. 4 is a diagram illustrating the relation between an estimation period and a reference period.

FIG. 4 is a diagram illustrating the relation between the estimation period and the reference period. The base time is the latest time. That is, the base time is, for example, time when the latest sensor data has been acquired. Note that when analysis and the like of the past data are performed, the base time may be any time in the past.

The estimation period is later than the base time and is designated by a user. Specifically, the estimation period is a period that starts a first time after the base time and ends a second time after the base time. For example, the estimation period may be: a period that starts one week after the base time and ends three weeks after the base time; a period that starts immediately after the base time and ends one week after the base time; or a period that starts three weeks after the base time and ends eight weeks after the base time.

The reference time is a time before the base time and set by the estimation device 22. The reference period is a period in which the time relation with respect to the reference time is the same as the time relation of the estimation period with respect to the base time. For example, when the estimation period starts one week after the base time and ends three weeks after the base time, the reference period starts one week after the reference time and ends three weeks after the reference time.

Figure 5:
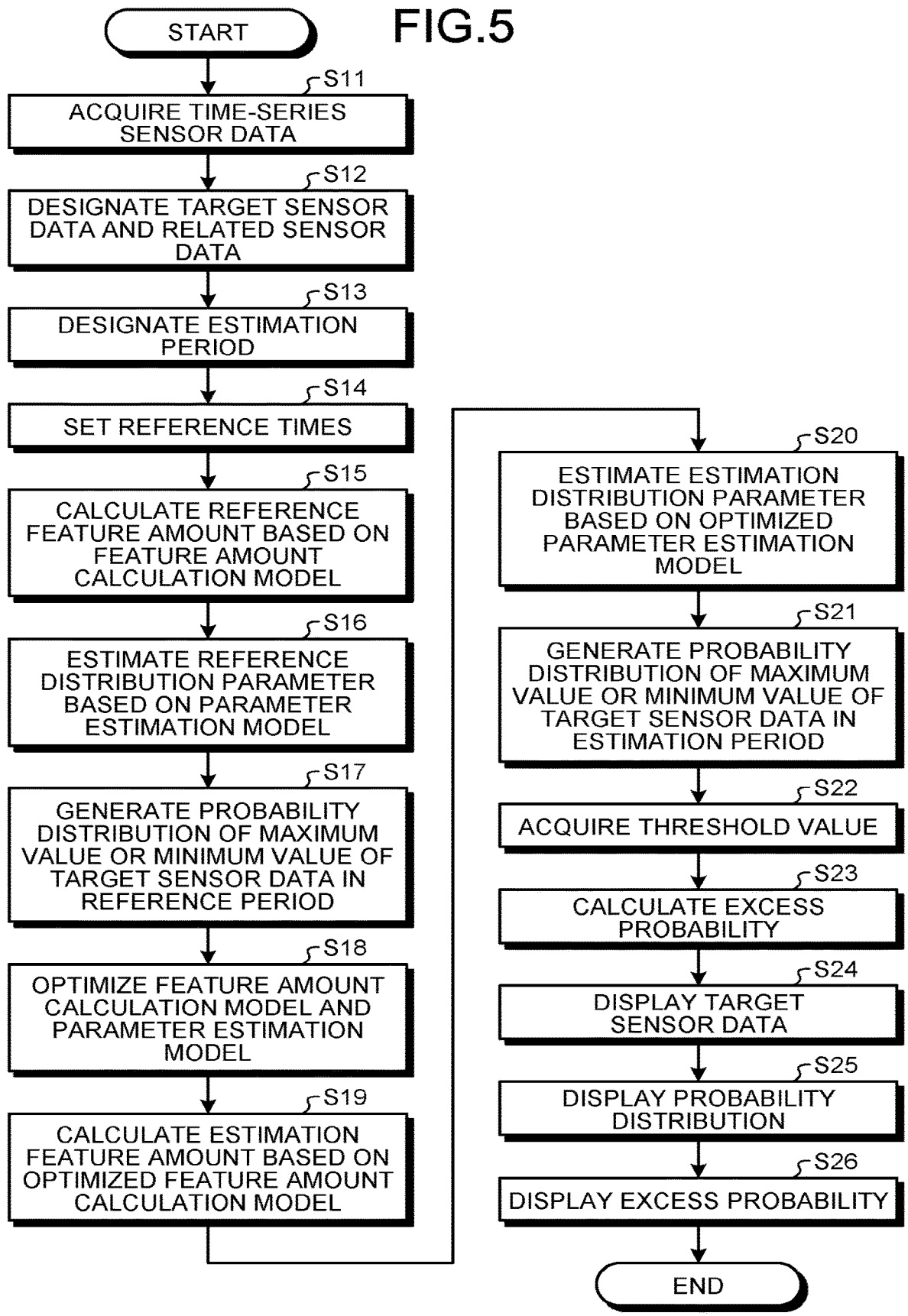
FIG. 5 is a flowchart illustrating a processing flow of the estimation device according to the first embodiment.

FIG. 5 is a flowchart illustrating a processing flow of the estimation device 22 according to the first embodiment. The estimation device 22 according to the first embodiment performs the processing according to the flow illustrated in FIG. 5.

First, at S11, the data acquisition unit 32 acquires a plurality of pieces of time-series sensor data, applies a time stamp representing an observed time to the sensor data, and stores the sensor data in the data storage unit 34. The data acquisition unit 32 acquires, for example, a plurality of pieces of sensor data at regular intervals, and stores the acquired sensor data in the data storage unit 34.

Subsequently, at S12, the data designation unit 36 receives the designation of target sensor data, for which a probability distribution of a maximum value or a minimum value is estimated, from among the acquired pieces of sensor data. Furthermore, the data designation unit 36 receives the designation of one or more pieces of related sensor data from among the acquired pieces of sensor data. Note that the data designation unit 36 may put the target sensor data into the one or more pieces of related sensor data. The data designation unit 36 receives the designation of the target sensor data and the one or more pieces of related sensor data, from a user or an external device.

Subsequently, at S13, the period designation unit 38 receives the designation of the estimation period. The period designation unit 38 receives the designation of the estimation period from the user or the external device. Note that the period designation unit 38 may receive a plurality of estimation periods. When the estimation periods are received, the estimation device 22 performs the processes of S14 to S26 for each of the estimation periods.

Subsequently, at S14, the period designation unit 38 sets a plurality of reference times. The respective reference times are times different from each other and each of them is a time before the base time. For example, the period designation unit 38 sets, as the reference time, a time such that the reference period is before the base time. For example, the period designation unit 38 specifies the reference times within a predetermined time range in the past. For example, the period designation unit 38 specifies a predetermined number of reference times from among the past three years.

Subsequently, at S15, the feature amount calculation section 62 calculates a reference feature amount representing the feature of the one or more pieces of related sensor data at a corresponding reference time for each of the reference times. The reference feature amount may be a vector including a plurality of values. In such a case, the feature amount calculation section 62 calculates the reference feature amount at the corresponding reference time based on the one or more pieces of time-series related sensor data before the corresponding reference time and a preset feature amount calculation model, for each of the reference times.

The feature amount calculation model is a model that receives the one or more time-series related sensor data and outputs a feature amount including one or more values. The feature amount calculation model is a model that is machine-learned by a deep learning technology. The feature amount calculation model may be, for example, a recurrent neural network such as a long-short time memory (LSTM) and a gated recurrent unit (GRU). Furthermore, the feature amount calculation model may be a feedforward neural network such as a one-dimensional convolutional neural network (1D-CNN).

Subsequently, at S16, for each of the reference times, the parameter estimation section 64 estimates a reference distribution parameter that is a distribution parameter of a probability density function representing the probability distribution of the maximum value or the minimum value of the target sensor data in the reference period. In such a case, the parameter estimation section 64 estimates the reference distribution parameter at a corresponding reference time based on the reference feature amount at the corresponding reference time and a preset parameter estimation model, for each of the reference times.

The parameter estimation model is a model that receives the feature amount calculated by the feature amount calculation model and including one or more values, and outputs distribution parameters. The distribution parameters are, for example, $\mu$, $\sigma$, and k of a probability density function p $(x_T;$ $\mu$, $\sigma$, and k$)$ of an extreme value distribution indicated in the following Formula (1).

$$p(x_T; \mu, \sigma, k) = \frac{1}{\sigma}\left(1 + k\frac{x-\mu}{\sigma}\right)^{-1-\frac{1}{k}} \exp\left(-\left(1 + k\frac{x-\mu}{\sigma}\right)^{\frac{1}{k}}\right) \quad (1)$$

In Formula (1) above, $\mu$ is a parameter representing a position. $\sigma$ is a parameter representing a scale. k is a parameter representing a shape. When n is the number of the reference times, T represents an index of the reference time and is an integer of 1 or more and n or less. $x_T$ represents a maximum value or a minimum value in a corresponding reference period at the T-th reference time.

Such a parameter estimation model is a model that is machine-learned by using a deep learning technology. The parameter estimation model may be, for example, a feedforward neural network or a support vector regression.

Subsequently, at S17, for each of the reference times, the distribution generation unit 42 generates the probability distribution of the maximum value or the minimum value of the target sensor data in the reference period, based on the reference distribution parameter estimated in S16. More specifically, for each of the reference times, the distribution generation unit 42 generates the probability density function p $(x_T; \mu, \sigma,$ and k$)$ of the extreme value distribution based on $\mu$, $\sigma$, and k estimated in S16. Moreover, the distribution generation unit 42 may further calculate the probability for each value of the maximum value or the minimum value based on the probability density function.

Subsequently, at S18, the optimization unit 44 optimizes the feature amount calculation model and the parameter estimation model, based on: an actual measurement value of the maximum value or the minimum value of the target sensor data in the reference period corresponding to each of the reference times; and the probability distribution of the maximum value or the minimum value of the target sensor data in the reference period, which is generated for each of the reference times based on the reference distribution parameter.

For each of the reference times, the likelihood calculation section 66 calculates the likelihoods of the actual measurement value of the maximum value or the minimum value of the target sensor data in the reference period and the probability distribution of the maximum value or the minimum value of the target sensor data in the reference period, which is calculated based on the reference distribution parameter. More specifically, the likelihood calculation section 66 calculates the likelihood by inputting the actual measurement value of the target sensor data at the corresponding reference time to $x_T$ in the probability density function p ($x_T$; µ, σ, and k) of the extreme value distribution generated in S17, for each of the reference times.

Then, the learning section 68 adjusts the internal parameters included in at least one of the feature amount calculation model and the parameter estimation model so as to maximize the sum of the likelihoods of the reference times. For example, the learning section 68 adjusts the internal parameters included in at least one of the feature amount calculation model and the parameter estimation model so as to maximize the sum of likelihoods calculated by inputting actual measurement values indicated by the following Formula (2).

$$\sum_{T=1}^{n} p(X_t; \mu, \sigma, k) \quad (2)$$

For example, the learning section 68 generates an update width of each of the internal parameters included in the feature amount calculation model and the parameter estimation model so as to maximize the sum of the likelihoods calculated by Formula (2) above. Then, the learning section 68 updates each of the internal parameters included in the feature amount calculation model and the parameter estimation model according to the generated update width.

The learning section 68 may maximize the sum of the likelihoods by, for example, a stochastic gradient descent method, or may maximize the sum of the likelihoods by using another optimization method such as a simulated annealing method. Furthermore, the learning section 68 may perform a batch process of maximizing the sum of the likelihoods by using the likelihoods of the reference times at the same time. Note that the estimation device 22 may sequentially select the reference times one by one to maximize the likelihood. In such a case, the estimation device 22 performs the processes of S15 to S18 for each reference time.

Subsequently, at S19, the feature amount calculation section 62 calculates an estimation feature amount representing the feature of the one or more pieces of related sensor data at the base time. The estimation feature amount is data representing the same feature as that of the reference feature amount and may be a vector including a plurality of values. In such a case, the feature amount calculation section 62 calculates the estimation feature amount at the base time based on the one or more pieces of time-series related sensor data before the base time and the feature amount calculation model optimized in the processes of S15 to S18.

Subsequently, at S20, the parameter estimation section 64 estimates an estimation distribution parameter that is the distribution parameter of the probability density function representing the probability distribution of the maximum value or the minimum value of the target sensor data in the estimation period. In such a case, the parameter estimation section 64 estimates the estimation distribution parameter in the estimation period based on the estimation feature amount at the base time and the parameter estimation model optimized in the processes of S15 to S18.

Subsequently, at S21, the distribution generation unit 42 generates the probability distribution of the maximum value or the minimum value of the target sensor data in the estimation period based on the estimation distribution parameter estimated at S20. More specifically, based on p, 6, and k estimated at S16, the distribution generation unit 42 generates the probability density function p ($x_T$; µ, σ, and k) of the extreme value distribution. Moreover, the distribution generation unit 42 may further calculate the probability for each value of the maximum value or the minimum value based on the probability density function.

Subsequently, at S22, the threshold value acquisition unit 46 acquires a threshold value for the maximum value or the minimum value in the estimation period. The threshold value acquisition unit 46 may acquire a threshold value designated by a user. Furthermore, the threshold value may be, for example, a value representing a safety margin in design of a device and the like related to the observation target 14.

Subsequently, at S23, the excess probability calculation unit 48 calculates an excess probability that the maximum value of the target sensor data in the estimation period exceeds a set threshold value, or an excess probability that the minimum value of the target sensor data in the estimation period becomes less than the threshold value, based on the generated probability distribution. For example, the excess probability calculation unit 48 calculates the excess probabilities by accumulating the probability that the maximum value exceeds the threshold value or the probability that the minimum value becomes less than the threshold value.

Subsequently, at S24, the sensor data display control unit 50 causes the display device 24 to display a time-series change in the target sensor data before the base time. For example, the sensor data display control unit 50 causes the target sensor data to be displayed in a manner of a time-series graph.

Subsequently, at S25, the distribution display control unit 52 causes the display device 24 to display the probability distribution of the maximum value or the minimum value of the target sensor data in the estimation period, which is represented by the generated probability density function. For example, the distribution display control unit 52 displays the probability distribution of the maximum value or the minimum value of the target sensor data in the estimation period on a time axis common to the time-series graph of the target sensor data.

Subsequently, at S26, the excess probability display control unit 54 causes the display device 24 to display the calculated excess probabilities. For example, the excess probability display control unit 54 may display the excess probabilities on the time-series graph of the target sensor data by arranging them in parallel, or may display the excess probabilities numerically. When the excess probability exceeds a preset value, the excess probability display control unit 54 may emphasize the excess probability and cause the display device 24 to display the emphasized excess probability.

When the process of S26 ends, the estimation device 22 ends the present flow. Note that the estimation device 22 may be configured to transmit the generated probability density function and excess probability to another device.

Figure 6:
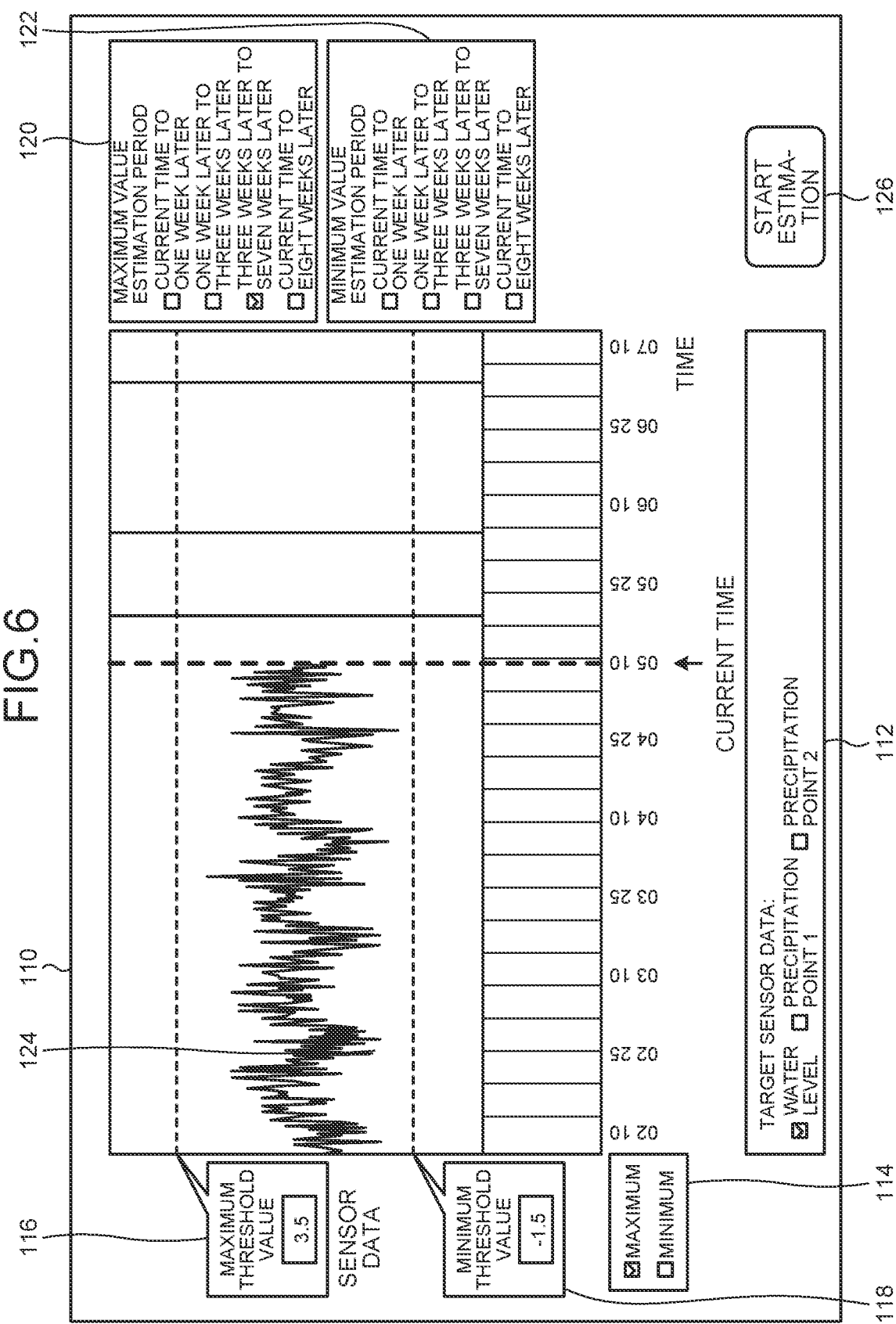
FIG. 6 is a diagram illustrating an input image for receiving input of information from a user.

FIG. 6 is a diagram illustrating an input image 110 for receiving input of information from a user. The estimation device 22 receives information from a user by causing the display device 24 to display the input image 110 illustrated in FIG. 6 prior to the estimation process.

The input image 110 includes a target sensor data selection box 112, an estimation type selection box 114, a maximum threshold value input box 116, a minimum threshold value input box 118, a maximum value estimation period selection box 120, a minimum value estimation period selection box 122, a target sensor data graph 124, and an estimation start button 126.

The target sensor data selection box 112 receives selection of target sensor data from among a plurality of pieces of sensor data. The estimation device 22 estimates a probability distribution of the target sensor data received by the target sensor data selection box 112. Note that the input image 110 may additionally display a selection box for selecting one or more pieces of reference sensor data from among the pieces of sensor data.

The estimation type selection box 114 receives selection regarding whether to estimate a probability distribution of a maximum value or to estimate a probability distribution of a minimum value. The estimation device 22 estimates either the probability distributions of the maximum value or the minimum value, which is received by the estimation type selection box 114.

The maximum threshold value input box 116 receives a threshold value when the probability distribution of the maximum value is estimated. When estimating the probability distribution of the maximum value, the estimation device 22 calculates an excess probability that the maximum value of the target sensor data in the estimation period exceeds the threshold value received by the maximum threshold value input box 116.

The minimum threshold value input box 118 receives a threshold value when the probability distribution of the minimum value is estimated. When estimating the probability distribution of the minimum value, the estimation device 22 calculates an excess probability that the minimum value of the target sensor data in the estimation period becomes less than the threshold value received by the minimum threshold value input box 118.

The maximum value estimation period selection box 120 receives the estimation period when the probability distribution of the maximum value is estimated. When estimating the probability distribution of the maximum value, the estimation device 22 estimates the probability distribution of the maximum value of the target sensor data in the period received by the maximum value estimation period selection box 120.

The minimum value estimation period selection box 122 receives the estimation period when the probability distribution of the minimum value is estimated. When estimating the probability distribution of the minimum value, the estimation device 22 estimates the probability distribution of the minimum value of the target sensor data in the period received by the minimum value estimation period selection box 122.

The target sensor data graph 124 represents time-series actual values before the base time (a "current time" in the example of FIG. 6) of the target sensor data. The target sensor data graph 124 is, for example, a line graph in which a horizontal axis denotes times and a vertical axis denotes sensor values. The estimation device 22 reads out the actual values of the target sensor data from the data storage unit 34, and causes the actual values to be displayed as the target sensor data graph 124. With this processing, the estimation device 22 can cause the display device 24 to display a time-series change in the target sensor data before the base time.

The estimation start button 126 receives a start instruction of the estimation process. When the estimation start button 126 is operated by a user, the estimation device 22 starts the estimation process based on the input information.

Figure 7:
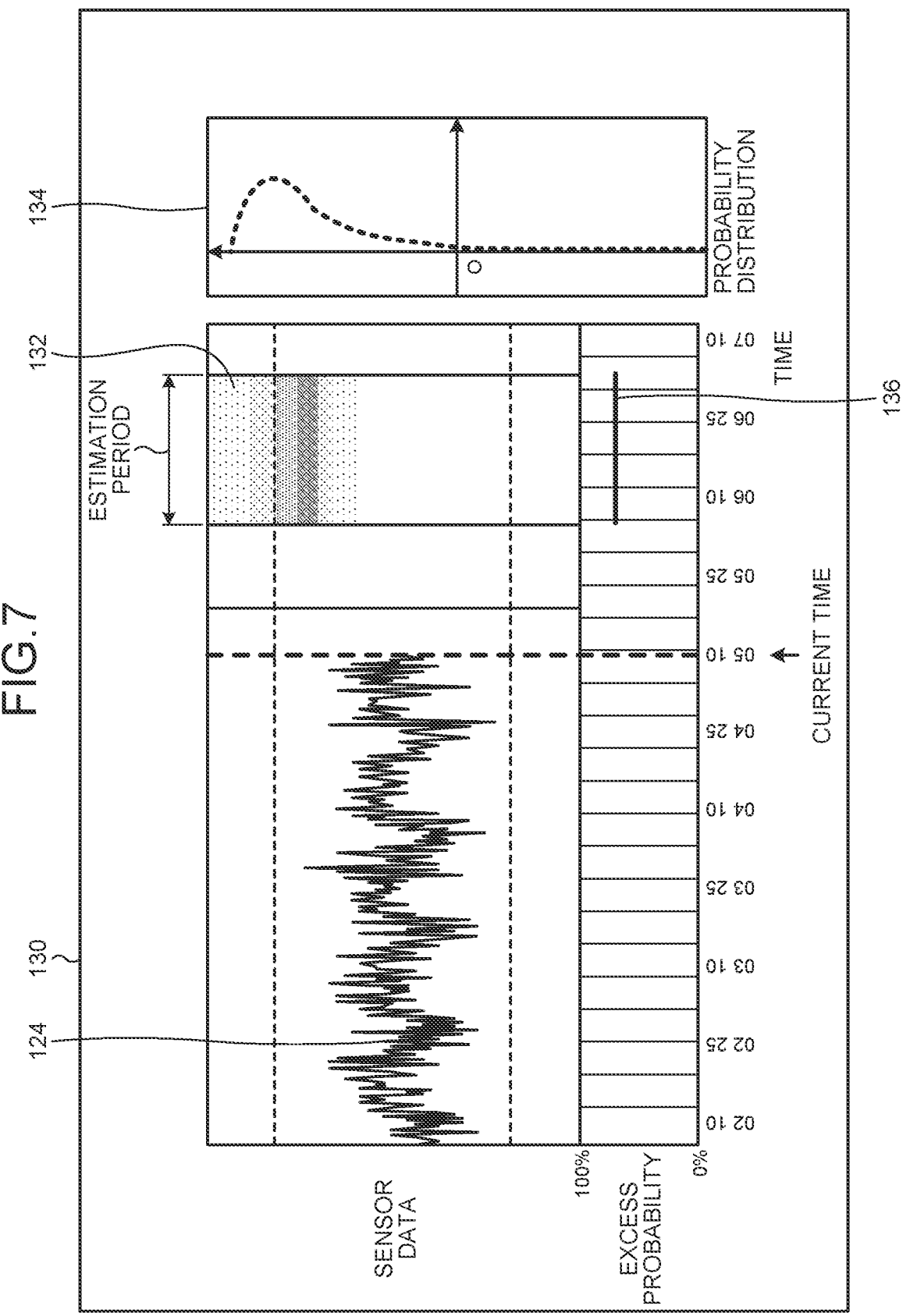
FIG. 7 is a diagram illustrating a first distribution image illustrating a probability distribution of an estimated maximum value.

FIG. 7 is a diagram illustrating a first distribution image 130, which is a first example of an image illustrating the probability distribution of the estimated maximum value. For example, when necessary information is input to the input image 110 illustrated in FIG. 6 and the estimation process is performed, the estimation device 22 causes the display device 24 to display the first distribution image 130 as illustrated in FIG. 7.

The first distribution image 130 includes a target sensor data graph 124, a distribution object 132, a distribution graph 134, and an excess distribution graph 136. The target sensor data graph 124 is the same as that in FIG. 6.

The distribution object 132 represents the probability distribution of the maximum value or the minimum value of the target sensor data in the estimation period. The distribution object 132 is included at a corresponding position of the estimation period on the time axis (horizontal axis) common to the target sensor data graph 124. The distribution object 132 is a gradation image that is drawn to correspond to the vertical axis (sensor value) of the target sensor data graph 124 such that the value range having a high probability of reaching the maximum value or the minimum value is darker and the value range having a low probability of reaching the maximum value or the minimum value is lighter. The estimation device 22 can display such a distribution object 132, thereby causing the display device 24 to display the probability distribution of the maximum value or the minimum value of the target sensor data in the estimation period.

The distribution graph 134 is a graph representing the probability distribution of the maximum value or the minimum value of the target sensor data in the estimation period. The distribution graph 134 is a graph in which the horizontal axis represents the probability distribution and the vertical axis represents the sensor value. In the distribution graph 134, the vertical axis is displayed to correspond to the vertical axis (sensor value) of the target sensor data graph 124. The estimation device 22 can display such a distribution graph 134, thereby causing the display device 24 to display the distribution of the maximum value or the minimum value of the target sensor data in the estimation period.

The excess distribution graph 136 is a graph representing the excess probability in the estimation period. The excess distribution graph 136 is a graph in which the horizontal axis represents time and the vertical axis represents the excess probability. The excess distribution graph 136 is displayed in parallel with the target sensor data graph 124 such that positions on the time axis match with those on the time axis of the target sensor data graph 124. The excess distribution graph 136 is drawn at a corresponding position of the estimation period on the time axis (horizontal axis) common to the target sensor data graph 124. The estimation device 22 can display such an excess distribution graph 136, thereby causing the display device 24 to display the excess probability.

Figure 8:
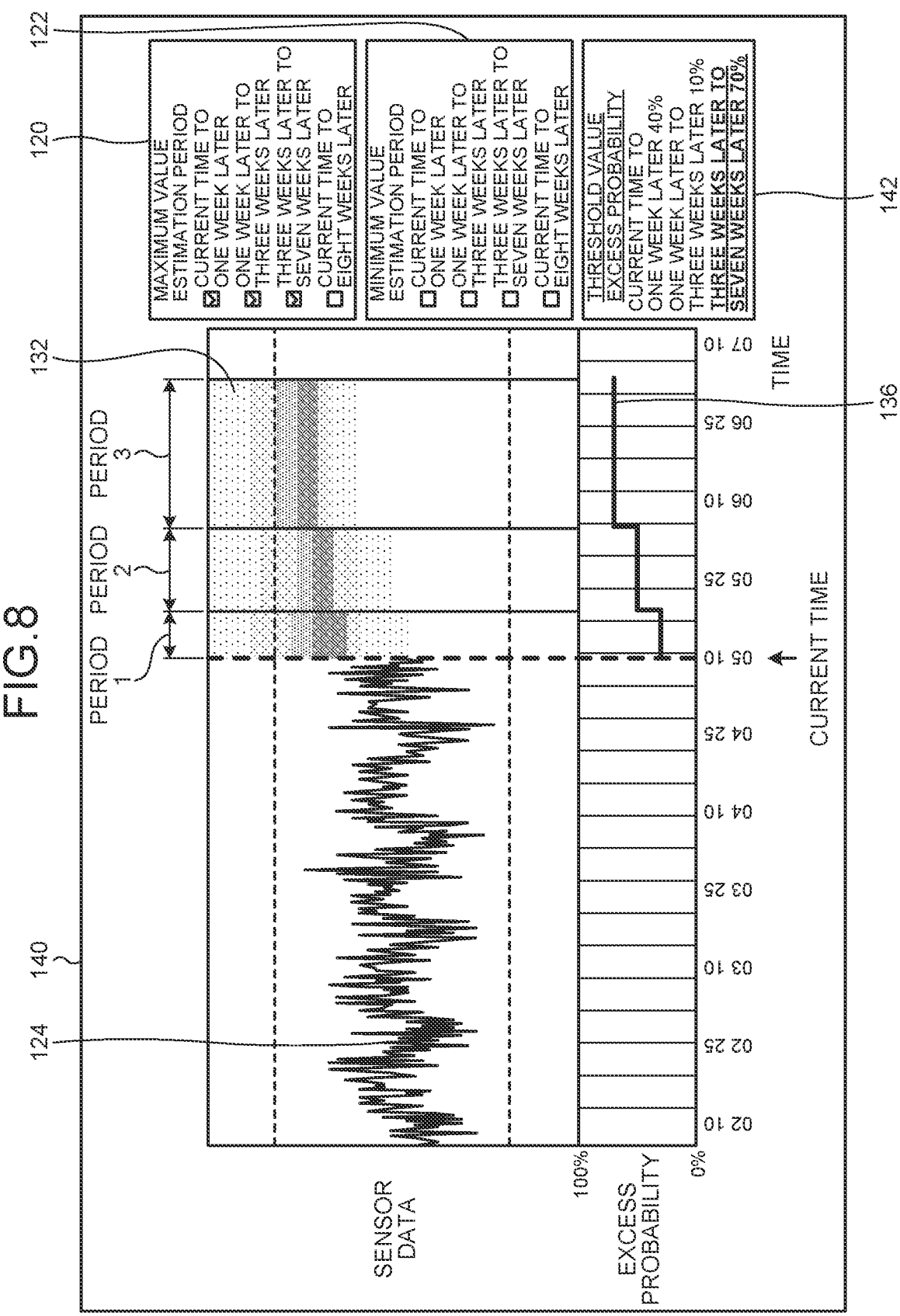
FIG. 8 is a diagram illustrating a second distribution image illustrating a probability distribution of an estimated maximum value.

FIG. 8 is a diagram illustrating a second distribution image 140, which is a second example of the image illustrating the probability distribution of the estimated maximum value. For example, when necessary information is input to the input image 110 illustrated in FIG. 6 and the estimation process is performed, the estimation device 22 may cause the display device 24 to display the second distribution image 140 as illustrated in FIG. 8.

The second distribution image 140 includes a target sensor data graph 124, a maximum value estimation period selection box 120, a minimum value estimation period selection box 122, a distribution object 132, an excess distribution graph 136, and an excess probability display box 142. The content of the target sensor data graph 124 is the same as that in FIG. 6.

The maximum value estimation period selection box 120 receives an estimation period when the probability distribution of the maximum value is estimated, similarly to FIG. 6. However, the maximum value estimation period selection box 120 illustrated in FIG. 8 can receive a plurality of estimation periods. When the estimation periods are received by the maximum value estimation period selection box 120, the estimation device 22 estimates the probability distribution of the maximum value and the excess probability for each of the estimation periods.

The minimum value estimation period selection box 122 receives an estimation period when the probability distribution of the minimum value is estimated, similarly to FIG. 6. However, the minimum value estimation period selection box 122 illustrated in FIG. 8 can receive a plurality of estimation periods. When the estimation periods are received by the minimum value estimation period selection box 122, the estimation device 22 estimates the probability distribution of the minimum value and the excess probability for each of the estimation periods.

The distribution object 132 represents the probability distribution of the maximum value or the minimum value of the target sensor data for each of the estimation periods when the probability distribution of the maximum value or the minimum value is estimated for each of the estimation periods. The estimation device 22 can display such a distribution object 132, thereby causing the display device 24 to display the probability distributions of the maximum values or the minimum values of the target sensor data in the estimation periods.

The excess distribution graph 136 represents the excess probability for each of the estimation periods when the probability distribution of the maximum value or the minimum value is estimated for each of the estimation periods. When the estimation periods are continuous, the excess distribution graph 136 is displayed in a manner of a line graph.

The excess probability display box 142 numerically indicates the excess probabilities in the estimation periods. When the probability distribution of the maximum value or the minimum value is estimated for each of the estimation periods, the excess distribution graph 136 numerically indicates the excess probability for each of the estimation periods. Furthermore, when the excess probability exceeds a preset value, the excess probability display box 142 emphasizes a numerical value representing the excess probability.

Figure 9:
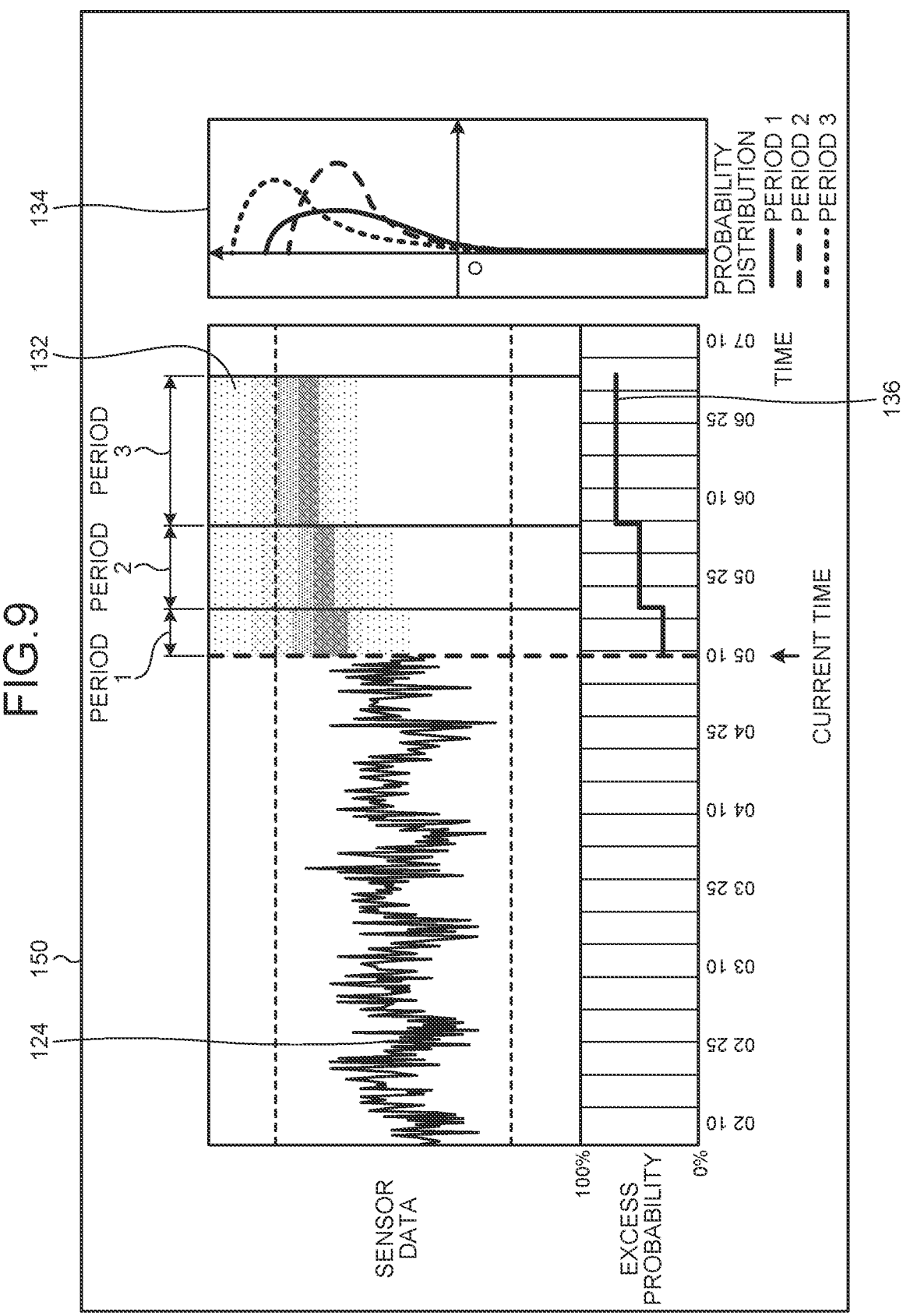
FIG. 9 is a diagram illustrating a third distribution image illustrating a probability distribution of an estimated maximum value.

FIG. 9 is a diagram illustrating a third distribution image 150, which is a third example of the image illustrating the probability distribution of the estimated maximum value. For example, when necessary information is input to the input image 110 illustrated in FIG. 6 and the estimation process is performed, the estimation device 22 may cause the display device 24 to display the third distribution image 150 as illustrated in FIG. 9.

The third distribution image 150 includes a target sensor data graph 124, a distribution object 132, a distribution graph 134, and an excess distribution graph 136. The target sensor data graph 124 is the same as that in FIG. 6. The contents of the distribution object 132 and the excess distribution graph 136 are the same as those in FIG. 8.

The distribution graph 134, when the probability distribution of the maximum value or the minimum value is estimated for each of the estimation periods, represents, as a graph, the probability distribution of the maximum value or the minimum value of the target sensor data in the estimation period. For example, the distribution graph 134 changes and displays the type, color, and the like of the line of the graph for each of the estimation periods. The estimation device 22 can display such a distribution graph 134, thereby causing the display device 24 to display the probability distributions of the maximum values or the minimum values of the target sensor data in the estimation periods.

Note that the estimation device 22 may cause the display device 24 to display an image in which various elements included in the input image 110, the first distribution image 130, the second distribution image 140, and the third distribution image 150 illustrated in FIG. 6 to FIG. 9 are variously combined.

As described above, the estimation system 20 according to the present embodiment can easily and accurately estimate the probability distribution of the maximum value or the minimum value of the time-series target sensor data, which is obtained by observing the observation target 14, in the estimation period.

Second Embodiment

Next, an estimation system 20 according to a second embodiment will be described. Note that in the following description of the second and subsequent embodiments, components having substantially the same configuration and function as those described in the above embodiment are denoted by the same reference numerals, and a detailed description thereof, except for differences, will be omitted.

Figure 10:
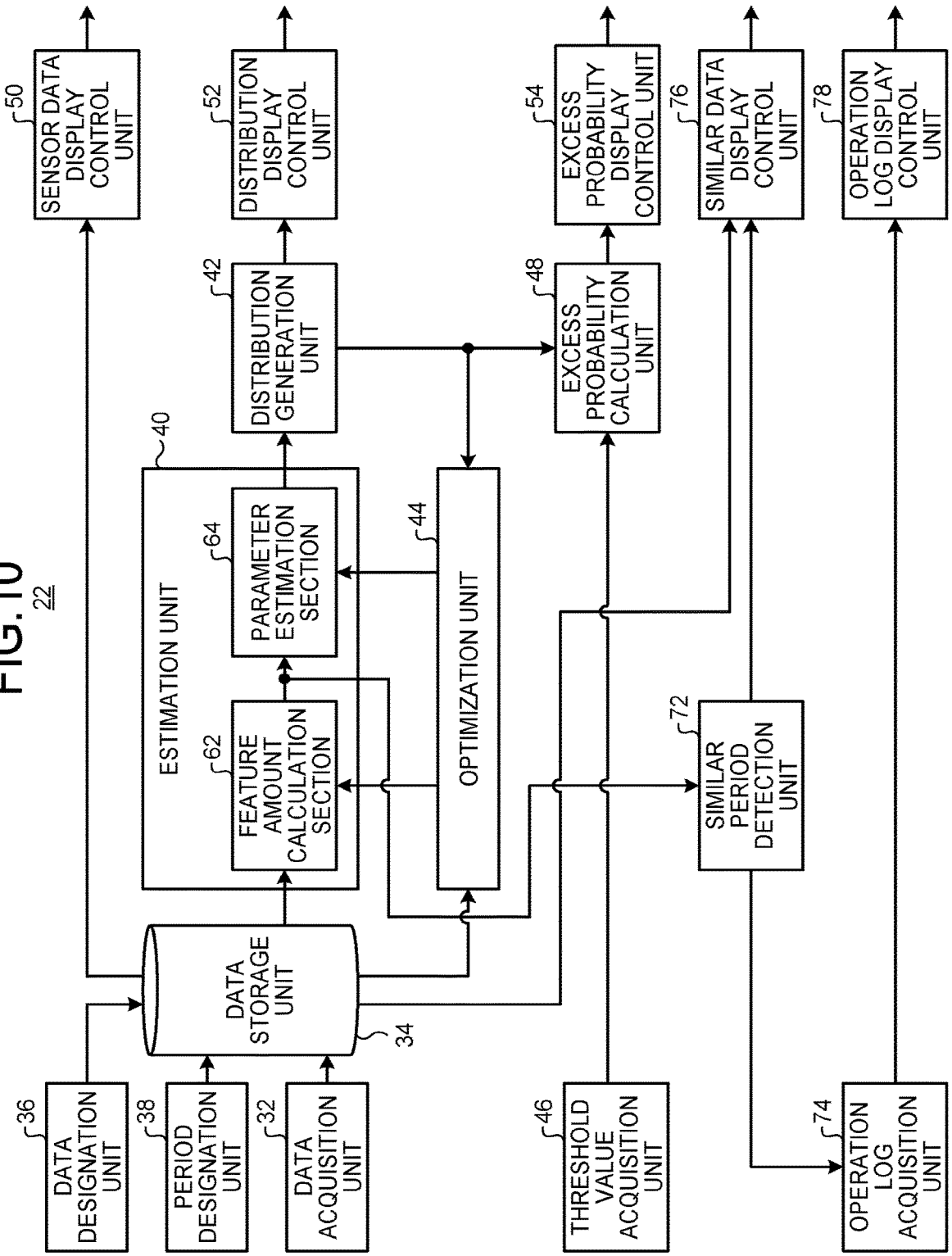
FIG. 10 is a configuration diagram of an estimation device of a second embodiment.

FIG. 10 is a diagram of the functional configuration of the estimation device 22 according to the second embodiment. The estimation device 22 according to the second embodiment further includes a similar period detection unit 72, an operation log acquisition unit 74, a similar data display control unit 76, and an operation log display control unit 78, in addition to the components of the first embodiment illustrated in FIG. 3.

The similar period detection unit 72 detects a similar period, in which the probability distribution of the maximum value or the minimum value of the target sensor data is similar to that in the estimation period, based on the one or more pieces of time-series related sensor data before the base time. The similar period is a period before the base time. The similar period detection unit 72 may detect a plurality of similar periods.

The operation log acquisition unit 74 acquires a log of operations on a device controlled in relation to the observation target 14 in the similar period. When two or more similar periods are detected, the operation log acquisition unit 74 acquires, for each similar period, the log of operations on the device, which is controlled in relation to the observation target 14.

The similar data display control unit 76 acquires time-series target sensor data in the similar period from the data storage unit 34 as similar data. Then, the similar data display control unit 76 causes the display device 24 to display a time-series change in the target sensor data in the similar period. When two or more similar periods are detected, the similar data display control unit 76 may cause the display device 24 to display the time-series change in the target sensor data for each similar period.

The operation log display control unit 78 causes the display device 24 to display the log of operations on the device controlled in relation to the observation target 14 in the similar period. When two or more similar periods are detected, the operation log display control unit 78 causes the display device 24 to display the log for each similar period.

Figure 11:
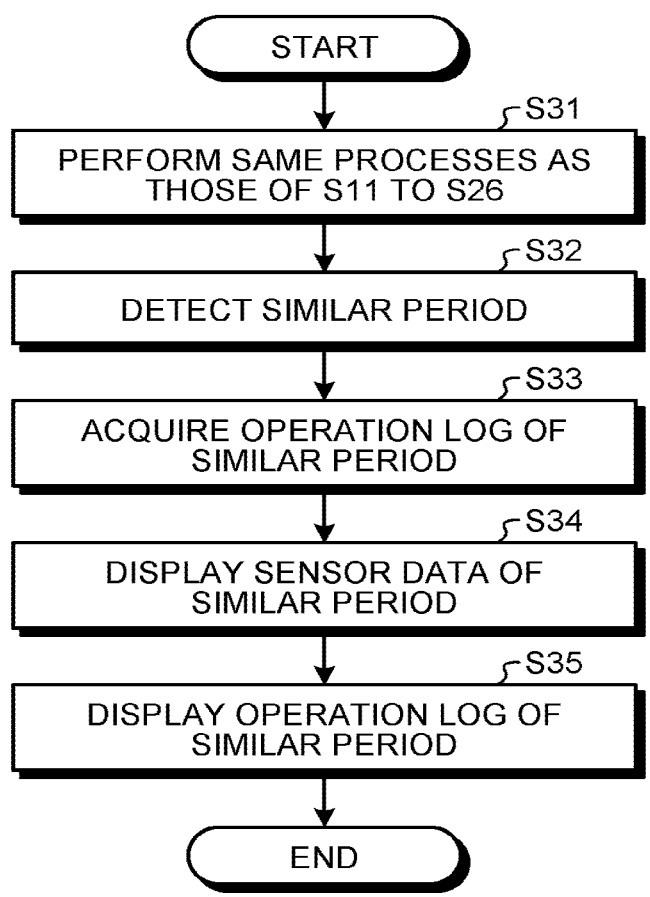
FIG. 11 is a flowchart illustrating a processing flow of the estimation device according to the second embodiment.

FIG. 11 is a flowchart illustrating a processing flow of the estimation device 22 according to the second embodiment. The estimation device 22 according to the second embodiment performs the processing according to the flow illustrated in FIG. 11.

First, at S31, the estimation device 22 performs the processes of S11 to S26 illustrated in FIG. 5. Note that the estimation device 22 may perform the processes of S32 to S35 at any timing after S19.

Subsequently, at S32, the similar period detection unit 72 detects the similar period, in which the probability distribution of the maximum value or the minimum value of the target sensor data is similar to that in the estimation period, based on the one or more pieces of time-series related sensor data before the base time. The similar period is a period before the base time. The similar period detection unit 72 may detect a plurality of similar periods. When the similar periods are detected, the estimation device 22 performs the processes of S33 to S35 for each of the similar periods.

For example, the similar period detection unit 72 acquires the estimation feature amount at the base time, which has been calculated by the feature amount calculation section 62. Moreover, the similar period detection unit 72 acquires the estimation feature amount at each of a plurality of times before the base time, which has been calculated by the feature amount calculation section 62. Subsequently, the similar period detection unit 72 detects a similar time when the estimation feature amount is similar to that at the base time, among the times. In such a case, the similar period detection unit 72 may detect two or more similar times.

For example, when the estimation feature amount includes a plurality of values, the similar period detection unit 72 may calculate a squared distance between the estimation feature amount at the base time and an estimation feature amount at a corresponding time for each of the times, and detect the time when the squared distance is equal to or less than a predetermined value as the similar time. Furthermore, the similar period detection unit 72 may calculate a distance between the estimation feature amount at the base time and the estimation feature amount at the corresponding time by a distance scale other than the squared distance, and detect the time when the distance is equal to or less than the predetermined value.

Then, the similar period detection unit 72 detects a similar period having the same time relation as the estimation period with respect to the base time for the detected similar time. For example, when the estimation period starts one week after the base time and ends three weeks after the base time, the similar period detection unit 72 detects, as the similar period, a period which starts one week after the similar time and ends three weeks after a reference time. Note that when two or more similar times are detected, the similar period detection unit 72 detects the similar period for each of the two or more similar times.

Subsequently, at S33, the operation log acquisition unit 74 acquires the log of operations on the device controlled in relation to the observation target 14 in the similar period detected at S32. The device controlled in relation to the observation target 14 is, for example, a floodgate and the like for discharging water from the reservoir when the observation target 14 is the water level of the reservoir. When a plurality of similar periods are detected, the operation log acquisition unit 74 acquires the log of operations on the device controlled in relation to the observation target 14, for each of the similar periods.

Subsequently, at S34, the similar data display control unit 76 acquires, as similar data, the time-series target sensor data in the similar period from the data storage unit 34. Then, the similar data display control unit 76 causes the display device 24 to display a time-series change in the target sensor data in the similar period. For example, the similar data display control unit 76 may cause a graph of the target sensor data in the similar period to be displayed at a position corresponding to the estimation period on the same axis as the graph of the target sensor data before the base time.

Furthermore, the similar data display control unit 76 may acquire time-series target sensor data including the similar period and a period before and after the similar time from the data storage unit 34, and cause the display device 24 to display a time-series change in the acquired target sensor data. In such a case, the similar data display control unit 76 may cause a graph of the target sensor data including the similar period and the period before and after the similar time to be displayed in parallel with the graph of the target sensor data before the base time.

With this, a user can easily compare the probability distribution of the maximum value or the minimum value in the estimation period with a change in the target sensor data in the similar period.

Subsequently, at S35, the operation log display control unit 78 causes the display device 24 to display the log of operations on the device controlled in relation to the observation target 14 in the similar period. When the similar periods are detected, the operation log display control unit 78 causes the display device 24 to display the log for each of the similar periods.

For example, a user needs to lower the water level by increasing a discharge amount when the water level is estimated to approach an upper limit of the storage capacity of the reservoir. By displaying such a log, the user is informed of an operation performed in the past period in which the water level of the reservoir was similar, so that the past operation examples can be referred to in a control plan for the discharge amount of the reservoir.

When the process of S35 ends, the estimation device 22 ends the present flow.

Figure 12:
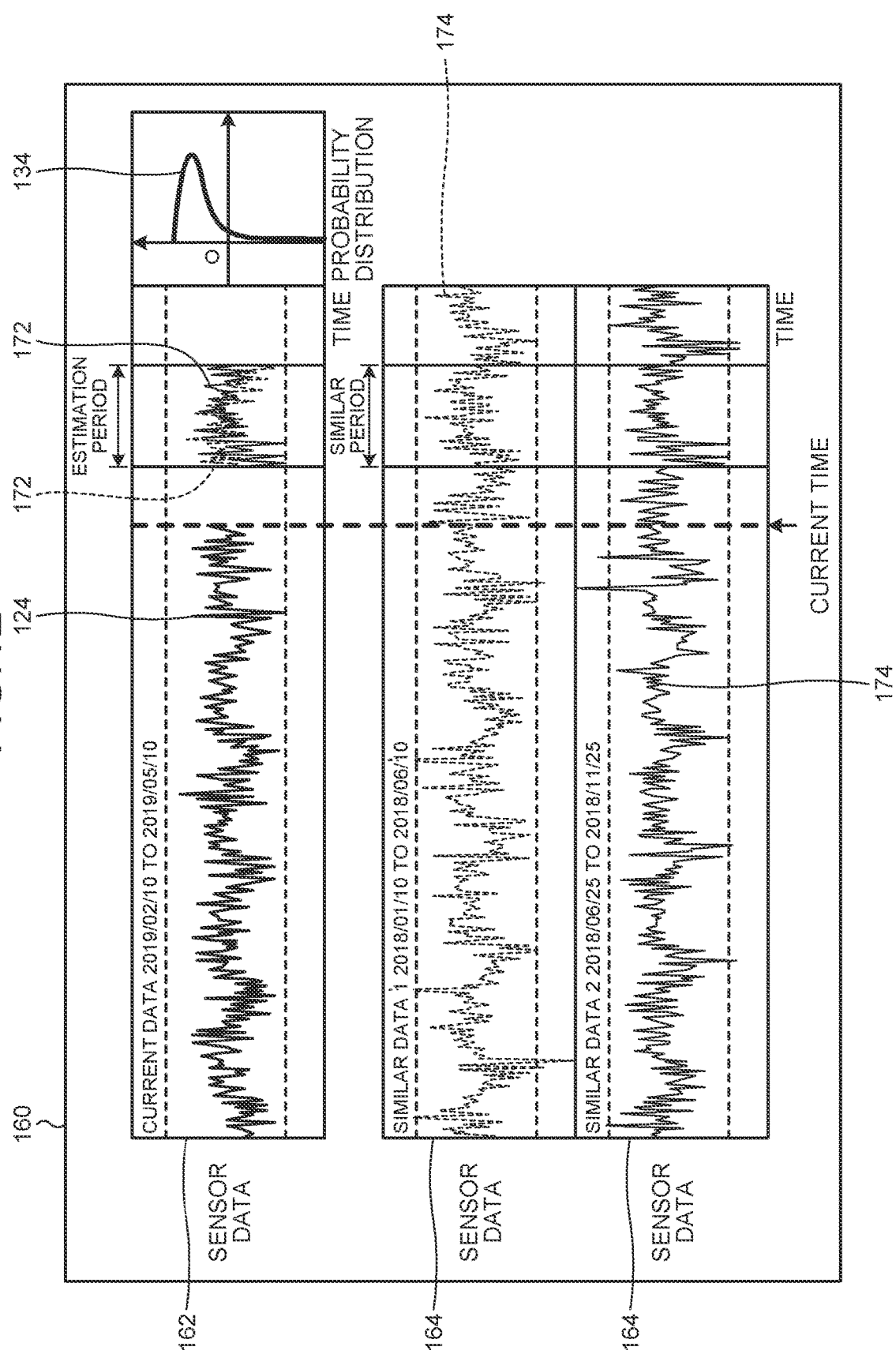
FIG. 12 is a diagram illustrating a fourth distribution image illustrating a probability distribution of an estimated maximum value.

FIG. 12 is a diagram illustrating a fourth distribution image 160 which is a fourth example of the image illustrating the probability distribution of the estimated maximum value. For example, the estimation device 22 according to the second embodiment causes the display device 24 to display the fourth distribution image 160 as illustrated in FIG. 12, for example.

The fourth distribution image 160 includes a current data area 162 and one or more similar data areas 164. The fourth distribution image 160 includes the similar data areas 164 corresponding to the number of detected similar periods.

The current data area 162 includes a target sensor data graph 124, one or more similar data graphs 172, and a distribution graph 134. The content of the target sensor data graph 124 is the same as that in FIG. 6. The content of the distribution graph 134 is the same as that in FIG. 7.

The one or more similar data graphs 172 correspond to one or more detected similar periods. Each of the one or more similar data graphs 172 is a graph representing a time-series change in the target sensor data in a corresponding similar period. Each of the one or more similar data graphs 172 is incorporated and displayed at a position corresponding to the estimation period on the same time axis as that of the target sensor data graph 124.

The one or more similar data areas 164 correspond to the one or more detected similar periods. Each of the one or more similar data areas 164 includes a long-term similar data graph 174. The long-term similar data graph 174 represents a time-series change in the target sensor data in a period including the similar period and the period before and after the similar time. The long-term similar data graph 174 is displayed side by side such that the time axis coincides with the time axis of the target sensor data graph 124 included in the current data area 162.

By displaying such a fourth distribution image 160 on the display device 24, the estimation device 22 allows a user to compare target sensor data in a period having similar features in the past with target sensor data at the base time. Accordingly, the user can generate a control plan for the operation of a device and the like with reference to the target sensor data in the period having similar features in the past.

Note that the estimation device 22 may put various combinations of various elements included the input image 110, the first distribution image 130, the second distribution image 140, and the third distribution image 150 illustrated in FIG. 6 to FIG. 9 into the fourth distribution image 160 illustrated in FIG. 12.

Figure 13:
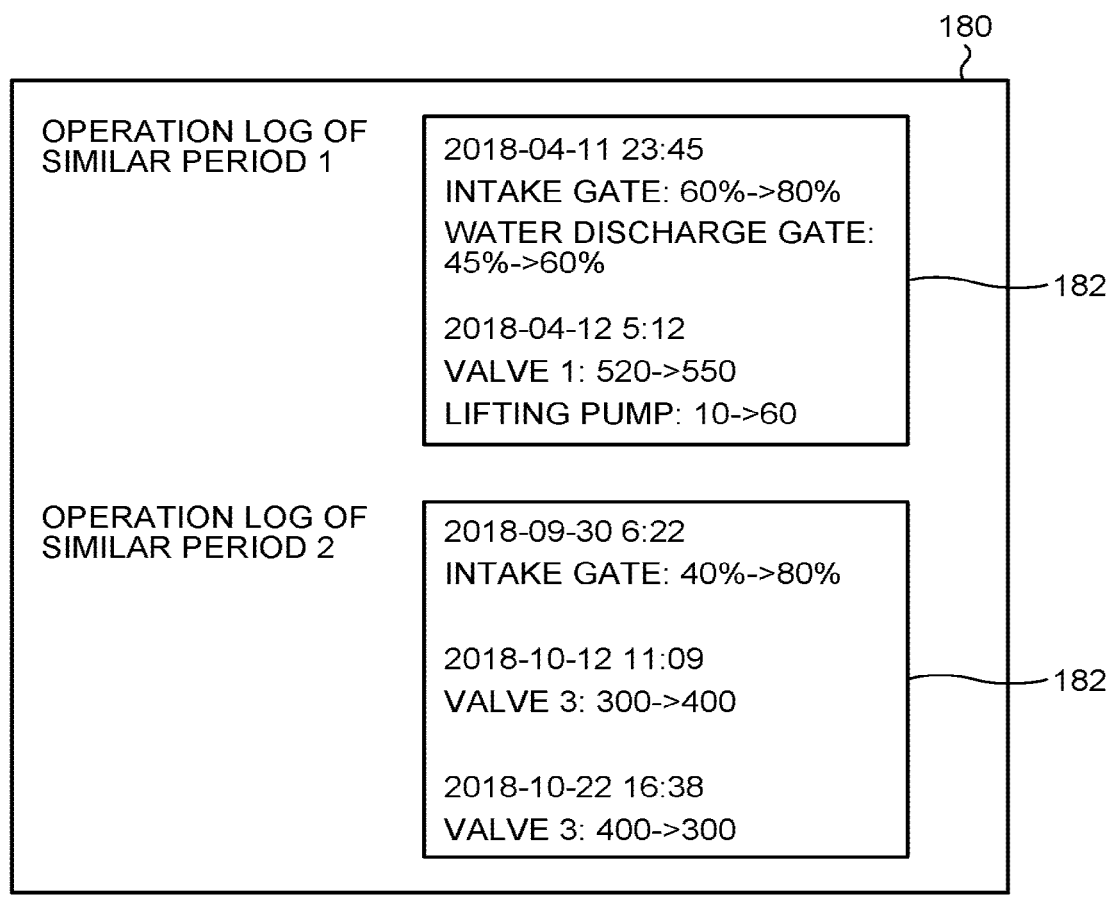
FIG. 13 is a diagram illustrating an example of a log image.

FIG. 13 is a diagram illustrating an example of a log image 180 illustrating the log of operations on the device controlled in relation to the observation target 14.

The log image 180 includes one or more log areas 182. The one or more log areas 182 correspond to the one or more detected similar periods.

Each of the one or more log areas 182 includes the log of operations on the device controlled in relation to the observation target 14, in a corresponding similar period. For example, each of the one or more log areas 182 includes an operation time, a name of an operated device, and an operation content.

By displaying such a log image 180 on the display device 24, the estimation device 22 can inform a user of an operation performed on the device controlled in relation to the observation target 14, in the period having similar features in the past. Accordingly, the user can generate a control plan for the device with reference to the operation performed on the device in the period having similar features in the past.

Note that the estimation device 22 may put the one or more log areas 182 included in the log image 180 into the fourth distribution image 160 illustrated in FIG. 12. In such a case, the estimation device 22 can display the log area 182 of a corresponding period in association with each of the one or more similar data areas 164. With this, the user can compare a time-series change in the target sensor data in each of the one or more similar periods with the log of operations on the device.

Hardware Configuration

Figure 14:
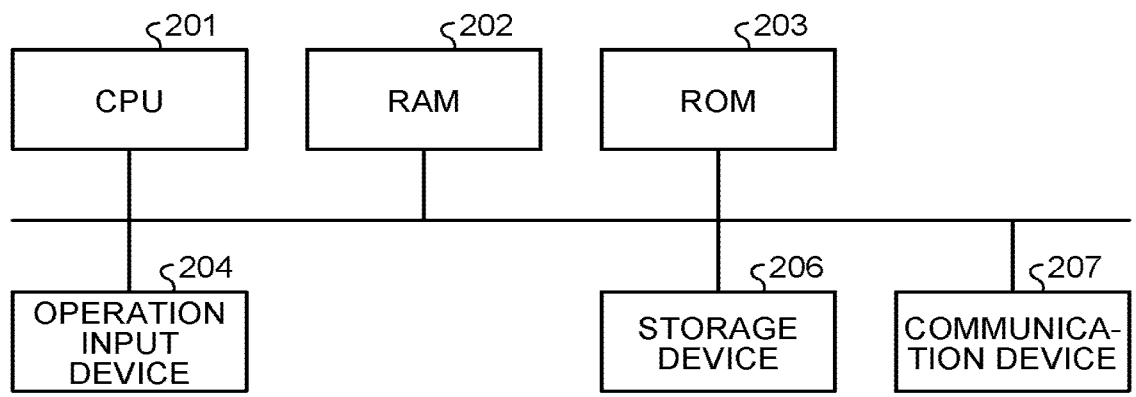
FIG. 14 is a diagram illustrating a hardware configuration of the estimation device.

FIG. 14 is a diagram illustrating an example of a hardware configuration of the estimation device 22 according to an embodiment. The estimation device 22 according to the present embodiment is implemented by, for example, an information processing device having a hardware configuration as illustrated in FIG. 14. The estimation device 22 includes a central processing unit (CPU) 201, a random-access memory (RAM) 202, a read-only memory (ROM) 203, an operation input device 204, a storage device 206, and a communication device 207. These components are connected by a bus.

The CPU 201 is a processor that performs an arithmetic process, a control process, and the like according to a computer program. The CPU 201 uses a predetermined area of the RAM 202 as a working area and performs various processes in cooperation with computer programs stored in the ROM 203, the storage device 206, and the like.

The RAM 202 is a memory such as a synchronous dynamic random-access memory (SDRAM). The RAM 202 serves as the working area of the CPU 201. The ROM 203 is a memory that stores the computer program and various information in a non-rewritable manner.

The operation input device 204 is an input device such as a mouse and a keyboard. The operation input device 204 receives information, which is input through a user's operation, as an instruction signal, and outputs the instruction signal to the CPU 201.

The storage device 206 is a device that writes and reads data to/from a storage medium made of a semiconductor such as a flash memory, a magnetically or optically recordable storage medium, and the like. The storage device 206 writes and reads data to/from the storage medium under the control of the CPU 201. The communication device 207 communicates with external devices via a network under the control of the CPU 201.

The computer program executed by the estimation device 22 of the present embodiment includes a data designation module, a data acquisition module, a period designation module, an estimation module, a distribution generation module, an optimization module, a threshold value acquisition module, an excess probability calculation module, a sensor data display control module, a distribution display control module, and an excess probability display control module. Moreover, the computer program may include a similar period detection module, an operation log acquisition module, a similar data display control module, and an operation log display control module. The computer program is loaded and executed on the RAM 202 by the CPU 201 (processor), thereby causing the estimation device 22 (information processing device) to serve as the data acquisition unit 32, the data designation unit 36, the period designation unit 38, the estimation unit 40, the distribution generation unit 42, the optimization unit 44, the threshold value acquisition unit 46, the excess probability calculation unit 48, the sensor data display control unit 50, the distribution display control unit 52, and the excess probability display control unit 54. Moreover, the computer program may cause the estimation device 22 (information processing device) to serve as the similar period detection unit 72, the operation log acquisition unit 74, the similar data display control unit 76, and the operation log display control unit 78. Note that the estimation device 22 may has a configuration in which at least one or some of the data acquisition unit 32, the data designation unit 36, the period designation unit 38, the estimation unit 40, the distribution generation unit 42, the optimization unit 44, the threshold value acquisition unit 46, the excess probability calculation unit 48, the sensor data display control unit 50, the distribution display control unit 52, the excess probability display control unit 54, the similar period detection unit 72, the operation log acquisition unit 74, the similar data display control unit 76, and the operation log display control unit 78 are implemented by a hardware circuit (for example, a semiconductor integrated circuit).

Furthermore, the computer program executed by the estimation device 22 of the present embodiment may be provided as a computer program product by being recorded on a non-transitory computer-readable recording medium, such as a CD-ROM, a flexible disk, a CD-R, or a digital versatile disc (DVD), as a file in a format installable or executable on a computer.

Furthermore, the computer program executed by the estimation device 22 of the present embodiment may be configured to be provided by being stored in a computer connected to a network such as the Internet and downloaded via the network. Furthermore, the computer program executed by the estimation device 22 of the present embodiment may be configured to be provided or distributed via the network such as the Internet. Furthermore, the computer program executed by the estimation device 22 may be configured to be provided by being incorporated into the ROM 203 and the like in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device for optimizing an observed value of an observation target by using estimated values of one or more related targets related to the observation target, the information processing device estimating a probability distribution of a maximum value or a minimum value of time-series target sensor data in a designated estimation period after a base time, the time-series target sensor data being obtained by observing the observation target, the observation target including one of a discharge amount from a reservoir in hydroelectric power generation and a blade angle in wind power generation, the information processing device comprising:
one or more hardware processors configured to:
calculate a reference feature amount representing a feature of one or more pieces of related sensor data at a reference time before the base time, the reference feature amount being calculated based on: one or more pieces of time-series related sensor data obtained by observing one or more related targets observed together with the observation target before the reference time; and a preset feature amount calculation model;
estimate a reference distribution parameter being a distribution parameter of a probability density function representing the probability distribution of the maximum value or the minimum value of the target sensor data in a reference period in which a time relation with respect to the reference time is the same as a time relation of the estimation period with respect to the base time, the reference distribution parameter being estimated based on the reference feature amount at the reference time and a preset parameter estimation model;
update at least one of the feature amount calculation model and the parameter estimation model based on: an actual measurement value of the maximum value or the minimum value of the target sensor data in the reference period corresponding to the reference time; and the probability distribution of the maximum value or the minimum value of the target sensor data in the reference period, the probability distribution being generated for the reference time based on the reference distribution parameter;
calculate an estimation feature amount representing the feature of the one or more pieces of related sensor data at the base time, the estimation feature amount being calculated based on: the one or more pieces of time-series related sensor data before the base time; and the updated feature amount calculation model;
estimate an estimation distribution parameter being the distribution parameter of the probability density function representing the probability distribution of the maximum value or the minimum value of the target sensor data in the estimation period, the estimation distribution parameter being estimated based on the estimation feature amount at the base time and the updated parameter estimation model;
generate, based on the estimation distribution parameter, the probability distribution of the maximum value or the minimum value of the target sensor data in the estimation period; and
cause a display device to display the probability distribution of the maximum value or the minimum value of the target sensor data in the estimation period, wherein one of the discharge amount from the reservoir in the hydroelectric power generation and the blade angle in the wind power generation is controlled based on the probability distribution of the maximum value or the minimum value of the target sensor data.

2. The device according to claim 1, wherein the base time is a latest time when the target sensor data and the one or more pieces of related sensor data have been observed.

3. The device according to claim 1, wherein the one or more hardware processors are configured to:
generate, based on the reference distribution parameter, the probability distribution of the maximum value or the minimum value of the target sensor data in the reference period.

4. The device according to claim 3, wherein the one or more hardware processors are configured to calculate an excess probability based on the probability distribution of the maximum value or the minimum value of the target sensor data in the estimation period.

5. The device according to claim 4, wherein the one or more hardware processors are configured to, when the excess probability exceeds a preset value, cause the display device to display the excess probability in an emphasized manner.

6. The device according to claim 1, wherein the one or more hardware processors are configured to optimize the feature amount calculation model and the parameter estimation model.

7. The device according to claim 1, wherein the one or more hardware processors are configured to:
calculate the reference feature amount at a corresponding reference time for each of a plurality of reference times before the base time, based on the one or more pieces of related sensor data before the corresponding reference time and the feature amount calculation model;

estimate the reference distribution parameter in the reference period for each of the reference times, based on the reference feature amount at the corresponding reference time and the parameter estimation model; and update the feature amount calculation model and the parameter estimation model based on: an actual measurement value of the maximum value or the minimum value of the target sensor data in the reference period corresponding to each of the reference times; and the probability distribution of the maximum value or the minimum value of the target sensor data in the reference period for each of the reference times.

8. The device according to claim 7, wherein the one or more hardware processors are configured to:

calculate likelihoods of the actual measurement value of the maximum value or the minimum value of the target sensor data in the corresponding reference period and the probability distribution of the maximum value or the minimum value of the target sensor data in the reference period, the probability distribution being calculated based on the reference distribution parameter; and adjust internal parameters included in at least one of the feature amount calculation model and the parameter estimation model such that a sum of likelihoods of each of the reference times is maximized.

9. The device according to claim 1, wherein the one or more hardware processors are configured to receive a designation of the target sensor data and the one or more pieces of related sensor data from a user from among a plurality of pieces of sensor data obtained by observing a plurality of targets.

10. The device according to claim 1, wherein the one or more hardware processors are configured to receive a designation of the estimation period from a user.

11. The device according to claim 10, wherein the one or more hardware processors are configured to:

receive a designation of a plurality of estimation periods;

estimate the reference distribution parameter in the reference period for each of the estimation periods;

update the feature amount calculation model and the parameter estimation model for each of the estimation periods; and estimate the estimation distribution parameter for each of the estimation periods.

12. The device according to claim 1, wherein the one or more hardware processors are configured to cause the display device to display a time-series change in the target sensor data before the base time.

13. The device according to claim 1, wherein the one or more hardware processors are configured to:

detect a similar period in which the probability distribution of the maximum value or the minimum value of the target sensor data is similar to the probability distribution in the estimation period, based on the one or more pieces of time-series related sensor data before the base time; and cause the display device to display a time-series change in the target sensor data in the similar period.

14. The device according to claim 13, wherein the one or more hardware processors are configured to:

acquire a log of operations on a device controlled in relation to the observation target in the similar period; and cause the display device to display the log in the similar period.

15. The device according to claim 1, wherein the information processing device is used for power generation for optimizing the observed value of the observation target by using the estimated values of the one or more related targets related to the observation target.

16. An information processing method implemented by a computer, the method being for optimizing an observed value of an observation target by using estimated values of one or more related targets related to the observation target, the method estimating a probability distribution of a maximum value or a minimum value of time-series target sensor data in a designated estimation period after a base time, the time-series target data being obtained by observing the observation target, the observation target including one of a discharge amount from a reservoir in hydroelectric power generation and a blade angle in wind power generation, the method comprising:

calculating a reference feature amount representing a feature of one or more pieces of related sensor data at a reference time before the base time, the reference feature amount being calculated based on: one or more pieces of time-series related sensor data obtained by observing the one or more related targets observed together with the observation target before the reference time; and a preset feature amount calculation model;

estimating a reference distribution parameter being a distribution parameter of a probability density function representing the probability distribution of the maximum value or the minimum value of the target sensor data in a reference period in which a time relation with respect to the reference time is the same as a time relation of the estimation period with respect to the base time, the reference distribution parameter being estimated based on the reference feature amount at the reference time and a preset parameter estimation model;

updating at least one of the feature amount calculation model and the parameter estimation model based on: an actual measurement value of the maximum value or the minimum value of the target sensor data in the reference period corresponding to the reference time; and the probability distribution of the maximum value or the minimum value of the target sensor data in the reference period, the probability distribution being generated for the reference time based on the reference distribution parameter;

calculating an estimation feature amount representing the feature of the one or more pieces of related sensor data at the base time, the estimation feature amount being calculated based on: the one or more pieces of time-series related sensor data before the base time; and the updated feature amount calculation model;

estimating an estimation distribution parameter being the distribution parameter of the probability density function representing the probability distribution of the maximum value or the minimum value of the target sensor data in the estimation period, the estimation distribution parameter being estimated based on the estimation feature amount at the base time and the updated parameter estimation model;

generating, based on the estimation distribution parameter, the probability distribution of the maximum value or the minimum value of the target sensor data in the estimation period;

causing a display device to display the probability distribution of the maximum value or the minimum value of the target sensor data in the estimation period; and controlling one of the discharge amount from the reservoir in the hydroelectric power generation and the blade angle in the wind power generation, based on the probability distribution of the maximum value or the minimum value of the target sensor data.

17. A computer program product comprising a non-transitory computer-readable recording medium on which an executable program for a computer is recorded, the program instructing the computer, which optimizes an observed value of an observation target by using estimated values of one or more related targets related to the observation target, to estimate a probability distribution of a maximum value or a minimum value of time-series target sensor data in a designated estimation period after a base time, the time-series target data being obtained by observing the observation target, the observation target including one of a discharge amount from a reservoir in hydroelectric power generation and a blade angle in wind power generation, the program further instructing the computer to:

calculate a reference feature amount representing a feature of one or more pieces of related sensor data at a reference time before the base time, the reference feature amount being calculated based on: one or more pieces of time-series related sensor data obtained by observing the one or more related targets observed together with the observation target before the reference time; and a preset feature amount calculation model;

estimate a reference distribution parameter being a distribution parameter of a probability density function representing the probability distribution of the maximum value or the minimum value of the target sensor data in a reference period in which a time relation with respect to the reference time is the same as a time relation of the estimation period with respect to the base time, the reference distribution parameter being estimated based on the reference feature amount at the reference time and a preset parameter estimation model;

update at least one of the feature amount calculation model and the parameter estimation model based on: an actual measurement value of the maximum value or the minimum value of the target sensor data in the reference period corresponding to the reference time; and the probability distribution of the maximum value or the minimum value of the target sensor data in the reference period, the probability distribution being generated for the reference time based on the reference distribution parameter;

calculate an estimation feature amount representing the feature of the one or more pieces of related sensor data at the base time, the estimation feature amount being calculated based on: the one or more pieces of time-series related sensor data before the base time; and the updated feature amount calculation model;

estimate an estimation distribution parameter being the distribution parameter of the probability density function representing the probability distribution of the maximum value or the minimum value of the target sensor data in the estimation period, the estimation distribution parameter being estimated based on the estimation feature amount at the base time and the updated parameter estimation model;

generate, based on the estimation distribution parameter, the probability distribution of the maximum value or the minimum value of the target sensor data in the estimation period; and cause a display device to display the probability distribution of the maximum value or the minimum value of the target sensor data in the estimation period, wherein one of the discharge amount from the reservoir in the hydroelectric power generation and the blade angle in the wind power generation is controlled based on the probability distribution of the maximum value or the minimum value of the target sensor data.

* * * * *